March 13, 1973　　　H. E. STEFFE　　　3,720,427

TRACTOR DRAWBAR EXTENSION

Filed July 14, 1971

INVENTOR.
Harlan E. Steffe
BY
His Att'y.

United States Patent Office 3,720,427
Patented Mar. 13, 1973

3,720,427
TRACTOR DRAWBAR EXTENSION
Harlan E. Steffe, Boyden, Iowa 51234
Filed July 14, 1971, Ser. No. 162,530
Int. Cl. B60d 1/00
U.S. Cl. 280—405 R          3 Claims

ABSTRACT OF THE DISCLOSURE

A tractor drawbar extender adapted for use with a lifting hitch and including side members extended upward for attachment to the upper member of the lifting hitch and extended downward to embrace a regular drawbar to hold the extender in alignment.

BACKGROUND AND SUMMARY OF THE INVENTION

This invention relates to tractor drawbars and more particularly to a device for extending the drawbar of an ordinary drawbar so that clearance can be provided for dual tractor wheels while holding alignment with the ordinary drawbar.

The usual drawbar on a farm tractor is of proper length to pull farm implements behind that tractor. However, a second wheel is often installed alongside each regular rear wheel in order to reduce packing of earth beneath the rear wheels. These dual wheels are very successful for their purpose but create a problem for a towed implement.

When an implement is pulled behind a tractor with dual wheels and the tractor is turned sharply, there is often an interference between the outer wheels and the pulled implement. This results in cut or chafed tires, dented implements and the like. In addition, the use of a longer drawbar provides more traction in the rear wheels. Because of the leverage action, the weight on the tongue of the implement is transmitted more to the rear wheels instead of the front wheels of the tractor resulting in added pulling traction.

My invention is adapted to extend the drawbar to avoid the interference while utilizing the upper connection of the three-point hitch as a bracing member. Alignment with the original drawbar is also preserved.

FIGURES

DESCRIPTION

Figure 1:
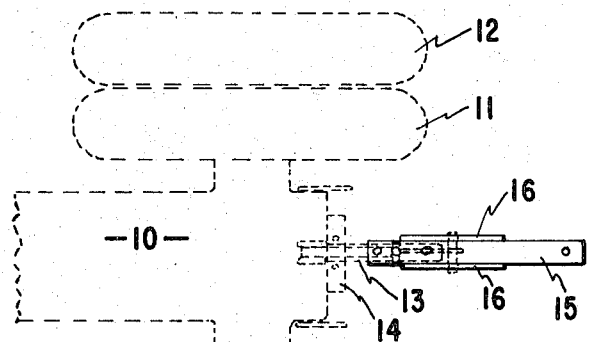
FIG. 1 is a top plan view of the extender mounted on a tractor.
Figure 2:
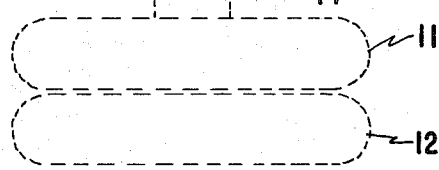
FIG. 2 is a top plan view of the extender to an enlarged scale and removed from the tractor.

Briefly my device comprises an extension for a drawbar adapted to be raised and lowered and having side supports to hold alignment with the existing drawbar.

More specifically and referring to the drawings, my device is adapted to be mounted on an ordinary farm tractor 10. Since the device is most useful on a tractor having dual wheels, I have illustrated such a tractor. The inner wheels 11 are the usual rear wheels of the tractor, and the outer wheels 12 are installed as extra equipment for the purpose of reducing the local pressure between the individual wheel and the earth on which the wheel rolls.

Figure 3:
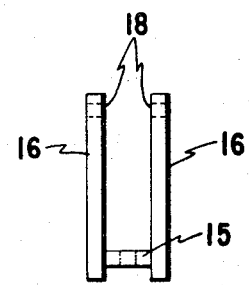
FIG. 3 is an end view of the device shown in FIG. 2.
Figure 4:
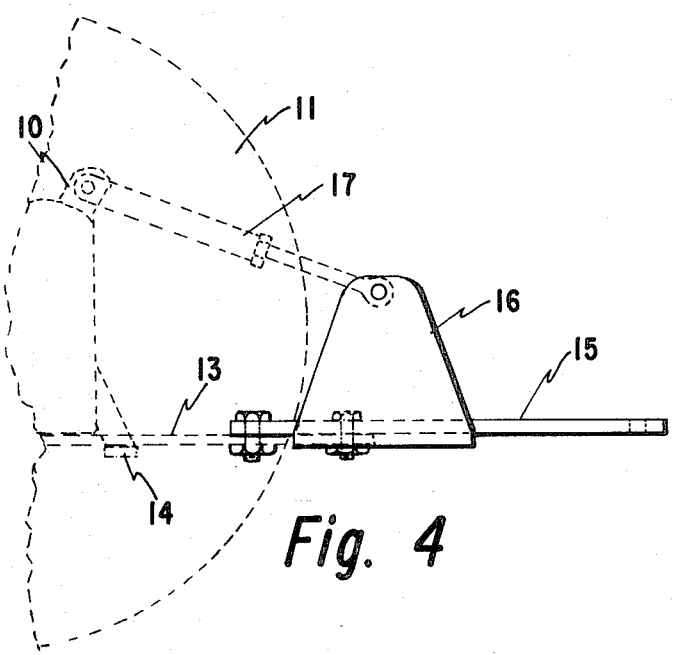
FIG. 4 is an elevational view of the device attached to a tractor.

The usual drawbar 13 of the tractor is mounted on a bar 14 attached to the tractor. My device includes a horizontal member 15 adapted to be bolted or otherwise fastened to the drawbar 13. Side members 16 straddle the bar 15 and are preferably welded thereto. These members 16, as best shown in FIG. 3, extend not only above the bar 15 to form upper lobes, but also below the bar a short distance.

The upper lobes are extended upward to allow connection of the device to the upper member 17 of the three-point hitch. A bolt or pin extending through a hole 18 in each lobe provides for this connection. A turnbuckle or similar adjustable device may be provided to allow shortening or lengthening to insure a rigid brace and to properly support the extension.

The bar 15 is made the same width as the drawbar 13 so that the lower extension of the side members 16 closely embraces the drawbar. Thus, the drawbar extension member 15 is kept rigidly aligned with the drawbar 13 itself and is rigidly supported in a vertical direction by the use of the upper lobes connected to the upper member 17.

Connection of the farm implement to the extended drawbar is accomplished quite simply by the same means as with an ordinary drawbar, and the operation of the tractor may also be similar. The difference is that the drawbar has now been extended so that the pulled implement is now kept clear of the dual wheels, although the rigidity and mobility of the drawbar is maintained. Also, because of the increased length of the drawbar, the moment arm of the weight on the tongue of the implement has been increased causing less weight on the front wheels of the tractor and more on the rear wheels, thereby increasing the traction of those wheels.

I claim:

1. For use with a tractor having a drawbar and a three point hitch including an upper member; a drawbar extender comprising extender bar means adapted to be removably connected to said drawbar and side means on said extender bar means adapted to embrace said drawbar to prevent misalignment therebetween, said side means extended upward to a position to be engaged with said upper member.

2. The device of claim 1 in which said upper member includes a turnbuckle, said side means being engageable with said turnbuckle.

3. The device of claim 1 in which said extender bar is of substantially the same width as said drawbar, said side means being extended below said extender bar to embrace said drawbar.

References Cited

UNITED STATES PATENTS

| | | | |
|---|---|---|---|
| 2,412,672 | 12/1946 | Calhoun | 280—482 |
| 3,645,560 | 2/1972 | Steele | 280—482 |
| 3,345,083 | 10/1967 | Roberson | 280—490 R |

FOREIGN PATENTS

| | | | |
|---|---|---|---|
| 1,176,642 | 11/1958 | France | 280—482 |
| 690,157 | 4/1953 | Great Britain | 280—482 |

LEO FRIAGLIA, Primary Examiner

U.S. Cl. X.R.
280—482